F. LATULIP.

Assignor of one-fourth to J. P. AUMOND.

TANNING PROCESS.

No. 10,792. Reissued Dec. 21, 1886.

WITNESSES.

Norris A. Clark.

C. Bendixon

INVENTOR:

Frederick Latulip per Dell, Laass & Dell his Attys

N. PETERS, Photo-Lithographer, Washington, D. C.

UNITED STATES PATENT OFFICE.

FREDERICK LATULIP, OF SYRACUSE, NEW YORK, ASSIGNOR OF ONE-FOURTH TO JOSEPH P. AUMOND, OF SAME PLACE.

TANNING PROCESS.

SPECIFICATION forming part of Reissued Letters Patent No. 10,792, dated December 21, 1886.

Original No. 341,583, dated May 11, 1886. Application for reissue filed October 21, 1886. Serial No. 216,871.

*To all whom it may concern:*

Be it known that I, FREDERICK LATULIP, of Syracuse, in the county of Onondaga and State of New York, have invented certain new and useful Improvements in Processes of Treating Rawhide for Chair Seats and Backs and such other Purposes as it may be Adapted for; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

Figure 1:
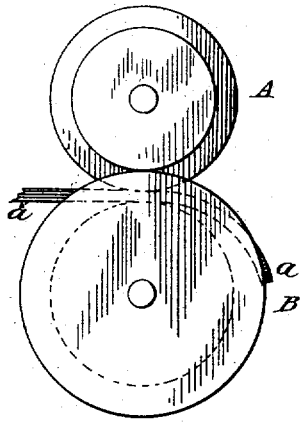
Figure 2:
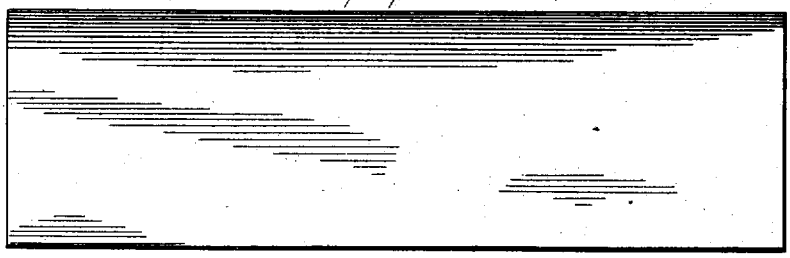
Figure 3:
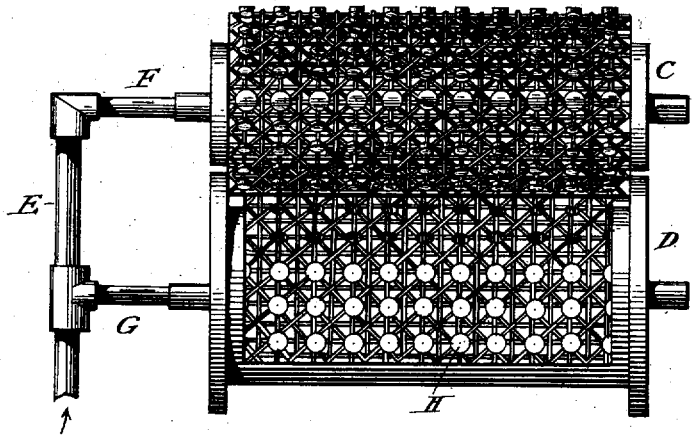

In the drawings, Figure 1 is a view of the squeezing or moisture-expelling rolls used in my process, showing them in end elevation with a piece of the material passing through them. Fig. 2 is a top plan view of a strip of the material of a width equal to the width of a chair-seat to be made, as hereinafter described; and Fig. 3 is a view in front elevation showing the finishing-rolls with a strip of the finishing material passing through them.

Like letters are used to designate the same parts wherever they occur in the drawings.

In carrying out my invention, I take the hide after it has been treated in the usual manner adopted by tanners, as follows, viz: first, with a solution of lime to remove the hair; second, with running water to remove the lime; third, with a solution of guano to full the skin; and, fourth, washed, when it is ready to undergo the operation involved in my process, which is as follows, viz:

First. I roll the hide thus prepared (marked *a* in Fig. 1) between plain rolls, such as represented at A B in Fig. 1, in order to press out all moisture. These rolls are simply plain squeezing-rolls and may be of any ordinary or approved construction suitable for the purpose.

Second. I take the hide thus rolled and soak it in a solution of acidulated water. This step, however, need only be resorted to when the hide is to be preserved for a short time.

Third. I take the hide and soak it in a solution of potash.

Fourth. I now wash the hide in clear water and again roll it through squeezing-rolls to expel the moisture, and at the same time distend its superficial area and reduce its thickness.

Fifth. I finally treat the hide with a solution of ammonia and alcohol, and thereby remove all greasy matter from the hide and render the same light.

The hide thus prepared may then be soaked in a suitable staining-liquid, and if it is to be manufactured into chair seats and backs I cut the hide into strips, as shown in Fig. 2 of the drawings, the width of the chair seat or back, and if it is desired to have the strips embossed with ornamental designs I pass the said strips between hollow imprinting or impression rolls C D, which have their surfaces carved or cast with the proper formation to produce any particular design desired. Either roll may contain the pattern and the other be plain, or the two may be made to correspond, one having the design cameo and the other intaglio. I have shown one roller plain, but do not of course confine myself to such arrangement. These rolls, hollow, as before mentioned, are supplied with steam by pipes E F G, through which the steam passes to the interior of the rolls and heats them. The heat of the rolls fixes the impression on the hide by drying out while rolling.

The result of the described new process is an article of great merit, which may be used for various purposes, and chair seats and backs manufactured from such hides and finished, as shown, for example, at H, Fig. 3, are very strong and almost indestructible by ordinary usage and sufficiently ornamental for the purpose.

Having thus described my invention, what I claim as new, and desire to secure by Letters Patent of the United States, is—

1. The within-described process of preparing hides, consisting in treating fulled skin by expressing the moisture therefrom, then soaking it in a solution of potash, then washing the skin in clear water, then again expressing the moisture therefrom, and finally treating the skin with a solution of ammonia and alcohol, substantially as set forth.

2. The process of manufacturing rawhide chair seats and backs, consisting in subjecting fulled skin to compression to expel the moisture, then treating said skin with a solution of potash, then washing it and again expressing the moisture, then treating it with a solution of ammonia and alcohol, then cutting it into strips of the required width, and then running said strips between heated rolls, substantially as specified.

3. The improved process for the manufacture of rawhide chair seats or backs, consisting in treating fulled skin by rolling between flat rolls to express moisture, then treating it with acidulated water, next with a solution of potash, then washing, and again expressing the moisture by rolls, next treating with a solution of ammonia and alcohol, then with a suitable staining-liquid, next cutting into strips the width of the finished article, then running said strips between hollow steam-heated impression-rolls, and finally cutting into proper length, substantially as set forth.

In testimony whereof I have hereunto set my hand, at the city of Syracuse, New York, this 5th day of October, 1886.

FREDERICK $\overset{\text{his}}{\underset{\text{mark}}{\times}}$ LATULIP.

Witnesses:
JOSEPH P. AUMOND,
H. P. DENISON,
C. BENDIXON.